United States Patent [19]

Koskela et al.

[11] Patent Number: 5,220,772
[45] Date of Patent: Jun. 22, 1993

[54] BALE SHEATHING METHOD AND APPARATUS

[75] Inventors: Mike Koskela, Astoria; Larry Inman, Warrenton, both of Oreg.; Walter Jay, Blair, Nebr.

[73] Assignee: Ag-Bag Corporation, Warrenton, Oreg.

[21] Appl. No.: 760,701

[22] Filed: Sep. 16, 1991

[51] Int. Cl.$^5$ .............................................. B65B 43/26
[52] U.S. Cl. .................................... 53/576; 53/384.1; 53/567; 53/570
[58] Field of Search .................... 56/218, 228; 53/459, 53/469, 384.1, 567, 570, 576, 585

[56] References Cited

U.S. PATENT DOCUMENTS

| Re. 31,810 | 1/1985 | Lee . | |
|---|---|---|---|
| 3,687,061 | 8/1972 | Eggenmuller et al. . | |
| 3,832,837 | 9/1974 | Burkhart et al. . | |
| 3,893,283 | 7/1975 | Dandl | 56/228 X |
| 4,018,036 | 4/1977 | Cicci | 56/218 X |
| 4,046,068 | 9/1977 | Eggenmuller et al. . | |
| 4,337,805 | 7/1982 | Johnson et al. . | |
| 4,470,241 | 9/1984 | Parry et al. | 53/585 X |
| 4,480,536 | 11/1984 | Burns | 5/585 X |
| 4,558,560 | 12/1985 | Koch | 56/228 |
| 4,606,176 | 8/1986 | Cundall | 53/576 X |
| 4,686,817 | 8/1987 | Brodrecht et al. | 53/576 X |
| 4,771,510 | 9/1988 | Kawai | 53/567 X |
| 4,888,937 | 12/1989 | Glenn | 53/576 X |
| 4,938,006 | 7/1990 | Korsgaard | 53/576 X |
| 4,945,715 | 8/1990 | Brodrecht | 53/576 X |
| 5,003,754 | 4/1991 | Stirling | 53/576 X |
| 5,016,424 | 5/1991 | Stirling | 53/576 X |

FOREIGN PATENT DOCUMENTS

| 9107867 | 6/1991 | PCT Int'l Appl. | 53/567 |
|---|---|---|---|
| 2135955 | 9/1984 | United Kingdom | 53/576 |

OTHER PUBLICATIONS

John Deere Flysheet New 1600 Mid-Pivot Mower/-Conditioner (89-06).

Primary Examiner—John Sipos
Assistant Examiner—Daniel Moon
Attorney, Agent, or Firm—Robert L. Harrington

[57] ABSTRACT

A machine for sheathing bales of material such as hay, straw and the like The machine has radially adjustable fingers to stretch a resilient sheath for the free insertion of the bales. The machine has elevating and guide mechanism for elevating and guiding the bales through the machine and as the bales exit the machine they are encased in the sheath. The resilient sheath will shrink to its original size to thereby fit closely to the contour of the bale. The machine has a swing away tow bar for offsetting the machine to either the left or right of the towing unit permitting the towing unit to travel on either side of the bale row. The swing away tow bar may be adjusted to a center position for ease of towing the machine from one job site to another or down a roadway. The swing away tow bar eliminates much of the side draft experienced previously.

8 Claims, 4 Drawing Sheets

5,220,772

BALE SHEATHING METHOD AND APPARATUS

BACKGROUND INFORMATION

1. Field of the Invention:

This invention relates to a machine and method for sheathing bales of farm crop, e.g. hay, and particularly to features that are directed to adapting the bale sheathing concept to commercial application.

2. Background of the Invention:

The storage of farm crops has progressed through a series of changes over recent years. Farm crops were for many years either stored in buildings, e.g. silage stored in a silo, grain stored in grain bins and hay stored in hay mows; or they were stored outside, e.g., hay was gathered into stacks or bound up in bales to be stacked and stored in the field.

More recently it has been recognized that huge plastic bags can be advantageously used to replace the storage buildings with substantial benefits. Initially the bags were used to replace silos by storing silage in plastic bags as large as 8 to 10 feet in diameter and 200 feet in length. Machines were specially built to perform the task of filling the bags and they were the subject of numerous improvements that were patented. U.S. Pat. No. 3,687,061 (Eggenmuller), U.S. Pat. No. 4,046,068 (Eggenmuller), U.S. Pat. No. Re 31,810 (Lee) and U.S. Pat. No. 4,337,805 (Johnson, et al) are representative of the improvements that were developed for the specific task of filling large plastic bags with silage.

Machines have more recently been developed for filling large plastic bags with grain. Grain is very different than silage. While both are presented to the bag as loose material, silage is compressible, a property that offers advantages as well as disadvantages compared to grain which flows more like a liquid and does not lend itself to stacking or packing. Machines have been developed specifically for grain bagging in consideration of the difference as represented by the commonly assigned application for U.S. patent filed Mar. 19, 1991, Ser. No. 671,386. The present invention deals with the special problems of bagging crops that have been bound into compacted bales, e.g., hay, straw, grass and the like.

Typically such bales have been stacked on the ground and a certain percentage of the baled material was sacrificed to the elements. Alternatively, the bales were stored in buildings with the attendant added cost of handling and building storage. An object of the present invention is to obviate these problems by storing the bales in plastic bags.

One of the considerations for all three forms of bagging is to avoid inadequate filling which produces a loose fitting bag. A filled bag is considered desirable to reduce the availability of air in the bags and to reduce the likelihood of tearing as a result of the loose fitting bag. In the case of silage and grain, the materials are stuffed into the bags. The stuffing process involves controlled braking whereby the bag length is drawn off the machine by pressure feeding of the loose material into the bag.

In the case of the bales, the material within the bales is already compacted into a large, heavy, rigid shape. Providing a bag of the right size to fit the bales and placing the bales into a tightly dimensioned plastic bag is not easily accomplished. The size of the bales produced by the baling machines have some variance in diameter adding to the problem. It is not feasible to slide the bale into a tight fitting bag. The bale, which is basically rigid, will readily tear the bag when the bale is either forced into the bag or attempts are made to slide the bag over the bale. Accordingly, in order to either slide the bale into the bag or slide the bag under the bale a much larger diameter bag than that of the bale is required resulting in the undesired loose fit.

The problem of the loosely fitting bag for compacted bales was addressed by David J. Cundall. Cundall initially developed a bale bagging machine which is disclosed in U.S. Pat. No. 4,606,176. This patent did not address the problem of the loose fitting bag, but Cundall was made aware of the problem in the subsequent development of the machine. Cundall's solution was to use a bag having elastic properties. The bag opening was fitted to a plurality of circumferentially arranged posts. The posts were mounted on arms that pivoted the posts from a closed opening to an oversized, i.e., stretched opening that exceeded the size of the bales. The bales were then placed into the bag and as the bag was pulled off the posts, it collapsed around the bales to conform closely to the shape of the bale, squeezing out the unwanted air in the process. In that the bag was thereby conformed tightly to the bale configuration, the chance of tearing the bag was substantially reduced. This latter improvement is disclosed in an International Application Number PCT/GB90/01820 filed Nov. 23, 1990 and published Jun. 13, 1991.

Whereas Cundall is believed to have invented the basic concept for elastically bagging hay bales and the like, a number of problems remained. The mechanism for moving the posts in and out was complex, it required power that often exceeded the available power of conventional farm tractors, and it was not acceptably adjustable for different sized bales. Furthermore, the concept of loading the bales into the bag required the machine to be driven through the bales. That is, a tractor carried the machine which was extended to one side of the tractor and as each bale was engaged, the machine raised the bale and guided it through the ring of posts. A high resistive load was applied against the machine which generated a high moment arm of force against the tractor. The bales contemplated herein are 4–5 feet in diameter and weigh many hundreds of pounds. The resistive force of such heavy bales applies a side shifting force that makes steering of most farm tractors difficult or impossible.

BRIEF DESCRIPTION OF THE PRESENT INVENTION

The improvements provided by the preferred embodiment of the present invention solve the problems described. The posts of the present machine are all independently mounted for radial movement and a hydraulic motor is provided for each post to radially position the posts and thereby enable the desired circular symmetry for different size bales, e.g. for sheathing 4 foot bales or 5 foot bales.

A goose neck type tow bar is employed that extends the tractor position substantially forward of the bagging machine. The tow bar has an adjustable locking mechanism to lock the relative positions, i.e., the wheel direction of the bagging machine is laterally offset but parallel to the wheel direction of the tractor. This enables the tractor to be driven alongside the bales but at a shallow angle that significantly reduces the imbalance of forces, i.e., it reduces the effect of the side directed force. The tow bar is attached centrally but at the top of the bagging machine as required to allow the bales t be directed into and through the machine. The machine (including the tow bar) is designed to resist the resulting bending force that induces forward tipping of the machine.

The goose neck concept is able to shift the tractor position to either side of the bales and to a central position for towing. The utilization of a goose neck attachment is generally disclosed in U.S. Pat. No. 3,832,837 but as disclosed therein is not suitable for a bale sheathing machine as contemplated herein.

The above improvements of the present invention will be more fully appreciated upon review of the detailed description and the drawings referred to therein which follow.

DESCRIPTION OF THE PREFERRED EMBODIMENT

Figure 1A:
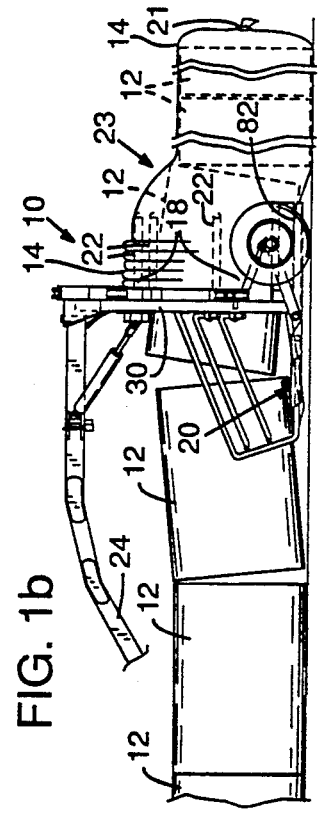
FIG. 1a and 1b illustrate the bale sheathing operation of the machine of FIG. 1.
Figure 1B:
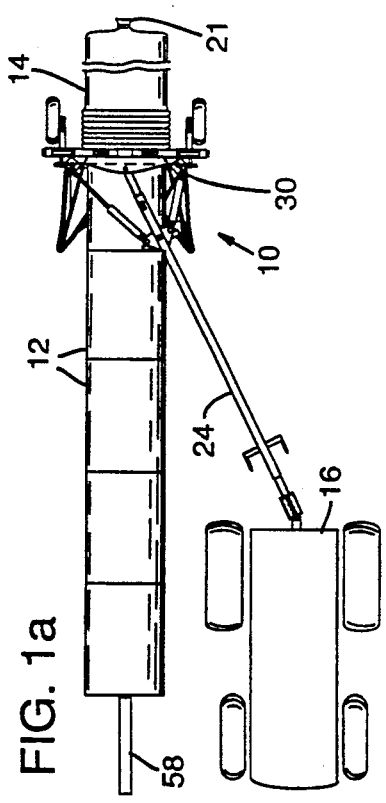

Refer now to FIGS. 1a and 1b of the drawings which illustrate a machine 10 for sheathing a row of bales 12 in a tubular sheath 14. The bales 12 are positioned in a line with one bale in abutment with a succeeding bale. The machine 10 is towed by a towing unit such as a tractor 16 connected by tow bar 24. The machine 10 is laterally offset but parallel to the tractor so that the tractor may be driven along side the bale row with the machine 10 being towed in alignment and thus through the row of bales 12.

Figure 3:
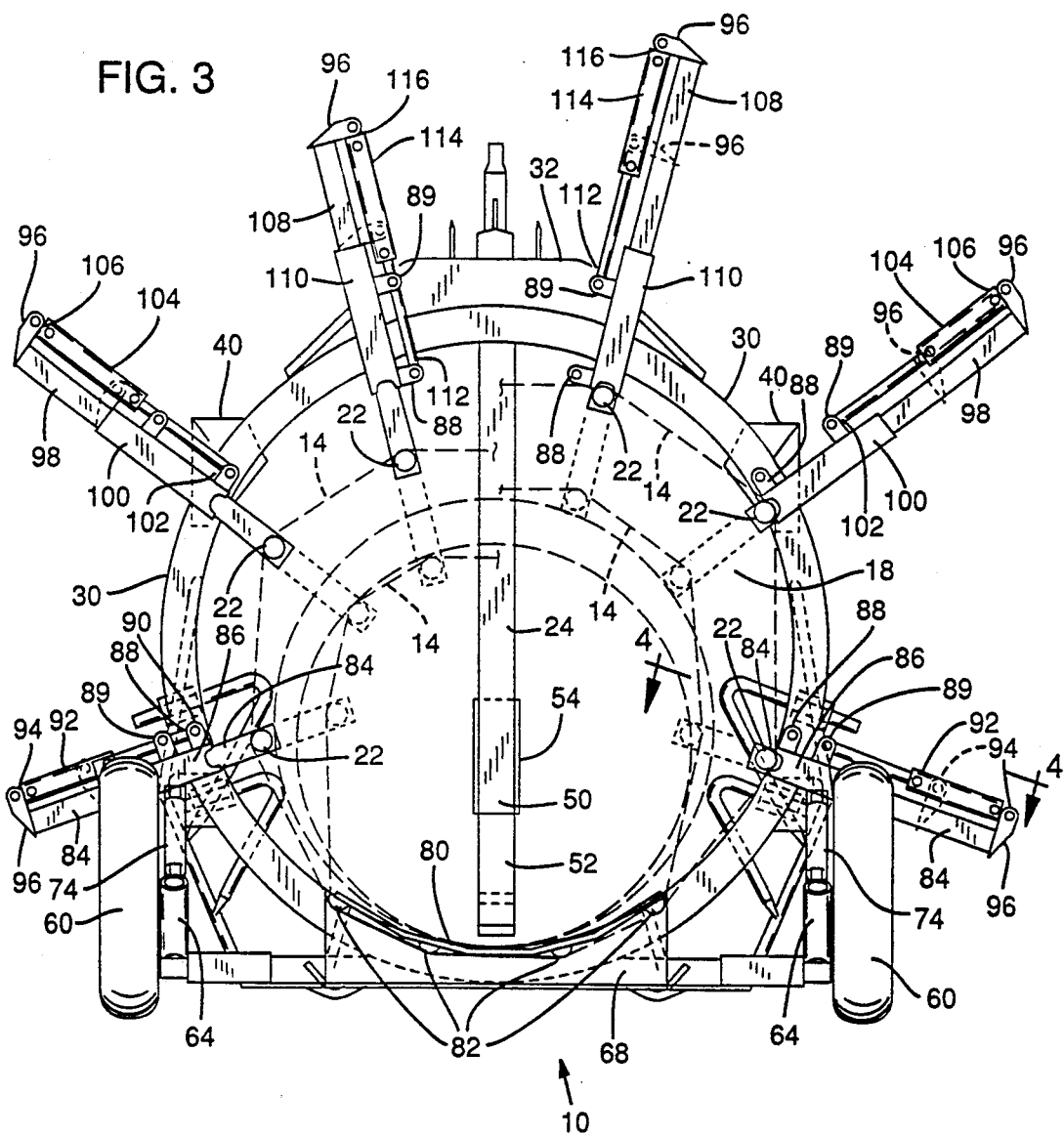
FIG. 3 is a rear view of the bale bagging machine of FIG. 1.

The machine 10 has a center opening or tunnel generally indicated by the numeral 18 which is dictated by ring 30 (see end view of ring 30 in FIG. 3). Opening 18 is of sufficient size for passage therethrough of the largest diameter bale to be sheathed. A guide and elevating structure 20 is provided to elevate, guide and support the bales through the tunnel 18. A tubular sheath 14 which is folded or bunched into a compact ring is fitted to the exit end of the tunnel 18 on radially adjustable posts or fingers 22 and fixed posts or fingers 82 which will later be described. The fingers 22 are adjusted radially outward (to be explained later) to stretch the sheath 14 to open radially larger than its relaxed state to permit passage of the bales through the exit end of the tunnel structure to permit free entry of the bale into the sheath. The adjustment of the fingers 22 will thus vary the dimension of the tunnel 18 through which the bales will pass. Note that end 21 of the sheath 14 is tied off for forming a closed end of the sheath 14.

The tractor 16 tows the machine 10 into the row of bales 12. The bales 12 which are in abutment provide sufficient resistance to movement or sliding on the ground and the guide and elevating structure will force the first bale 12 in the row to be elevated as the machine 10 progresses down the bale row. As the machine 10 progresses the first bale 12 is elevated and guided into the tunnel structure and as the machine continues relative to the bale, the bale will travel through and exit the tunnel 18. As the bale exits the tunnel it will of course come into contact with the closed end 21 of the sheath 14 forcing a length of the sheath to be pulled of the fingers 22 and 82. As the bale 12 exits the tunnel 18 the sheath material collapses around the bale (indicated by arrow 23 in FIG. 1b). The bale is then redeposited on the ground in its initial position except now it is encased in the sheath 14. The sheath 14 being of a resilient material will conform closely to the bale dimension as illustrated in FIG. 1b. As the machine travels down the bale row, the second and succeeding bales will be elevated and guided through the tunnel to be encased in the sheath 14 and deposited back o the ground in their original position. It should be noted that as the first bale is elevated and passes through the machine, the second bale which is in abutment with the first bale will be elevated and guided directly behind the first bale thereby forcing continued movement of the first bale through the tunnel. The bales remain in abutment during and following the sheathing operation.

Figure 1:
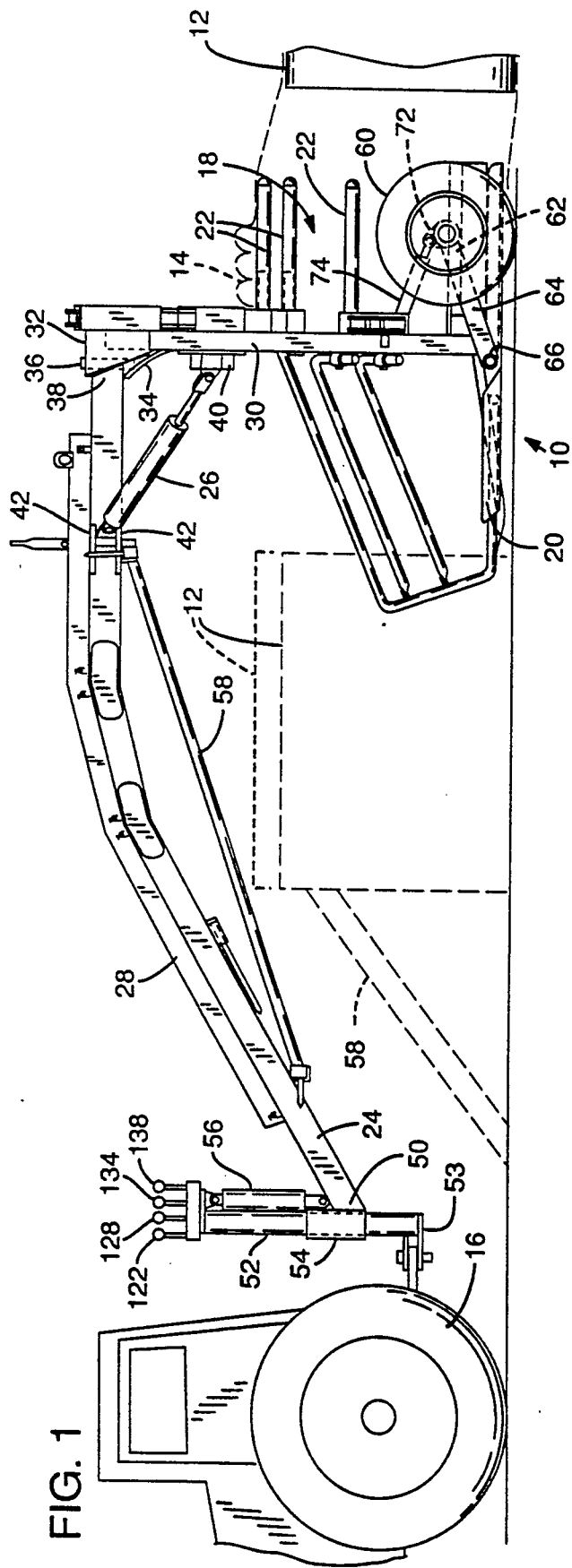
FIG. 1 is a side view of a bale sheathing machine of the present invention.
Figure 2:
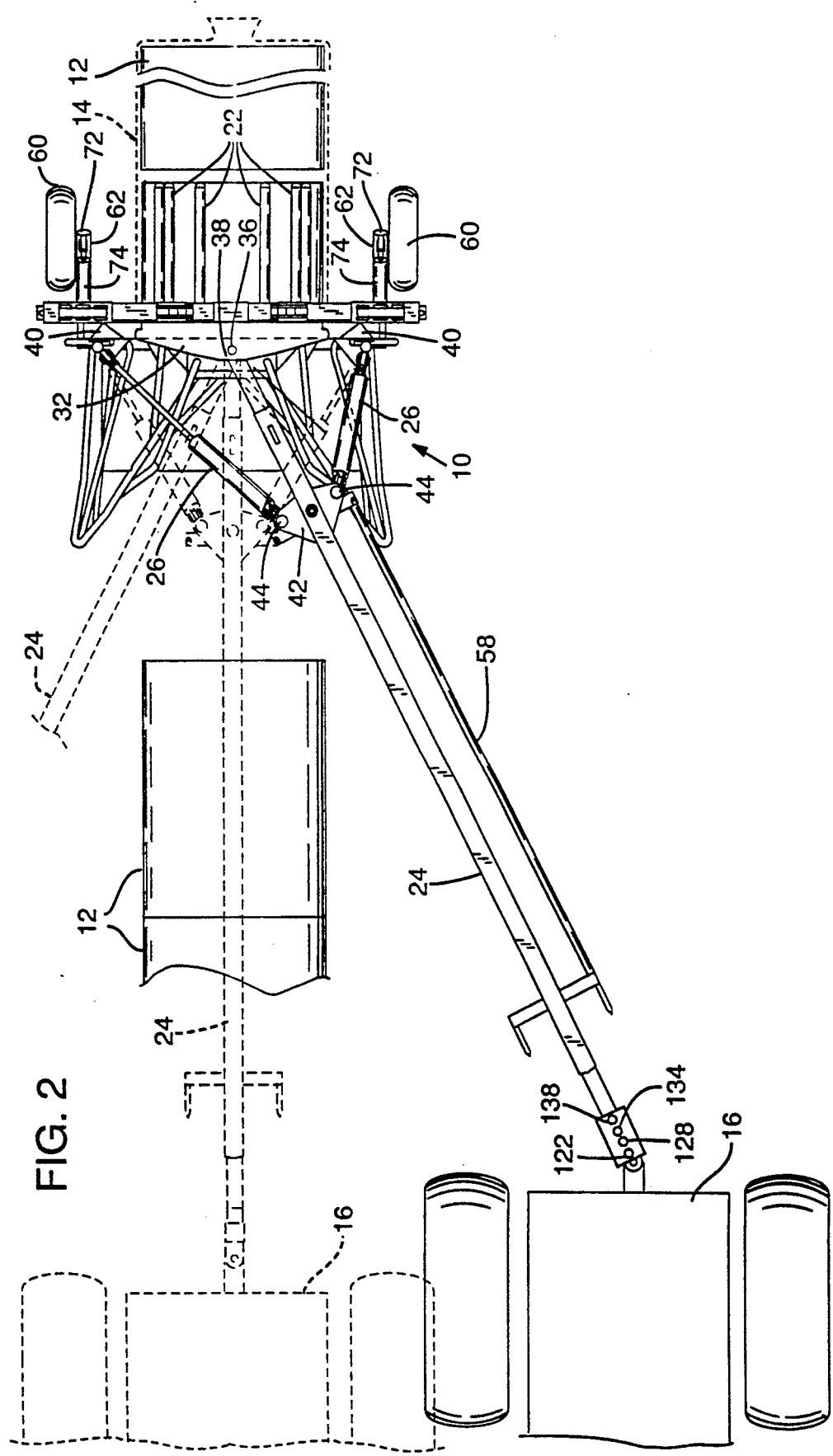
FIG. 2 is a top view of the sheathing machine of FIG. illustrating the various relative positions of the tractor and baling machine.

Referring now to FIGS. 1 and 2, to facilitate offsetting the wheel direction of machine 10 from that of tractor 16, the machine 10 has a swing away tow bar 24. As seen in FIG. 2, the tow bar 24 is adjustable by hydraulic cylinders 26 and may be adjusted to offset the machine 10 to either the left or the right of the tractor so the tractor may be driven down either side of the bale row with the machine addressing the bale row. For ease in towing from one job site to another or down a roadway the tow bar 24 may also be adjusted to a center position so the machine 10 will trail directly behind the towing unit such as the tractor 16.

Still referring mainly to FIGS. 1 and 2 but also to FIG. 3, the tunnel 18 of the machine 10 includes a ring 30 which forms the main frame member of the machine. A shaped plate 32 is fixedly attached to the top portion of the ring 30 at its outer surface and a plate 34 is fitted to the front surface of the top portion of the ring 30. The plates 32 and 34 are fixedly attached to the ring as by welding. The plates 32 and 34 extend forwardly a shown in FIGS. 1 and 2 and are suitably spaced to receive an end 38 of the tow bar 24 therebetween. The end 38 of the tow bar 24 and the plates 32 and 34 are suitably bored in a conventional manner for pivotally attaching the end 38 of the tow bar between the plates 32, 34 by a pivot pin 36 with the tow bar extending forwardly. Mounting brackets 40 are fixedly attached to the ring 30 as by welding, one bracket provided on each side as shown in the figures. Each bracket 40 is configured to pivotally mount one end of a cylinder 26 in a conventional manner. A pair of plates 42 are fixedly attached to the tow bar 24 as by welding, with one plate 42 mounted on the top and the other plate mounted on the underside of the tow bar 24 as shown. The plates 42 extend an equal distance on each side of the tow bar and have suitable bores for receiving a pin 44 for pivotally mounting the opposite end of the cylinder 26. As shown, a cylinder 26 is mounted on each side of the tow bar 24 and is connected to the ring 30. The cylinders 26 (a motor mechanism) will pivot the tow bar 24 on the pivot pin 36 to position the tow bar relative to the machine to offset the machine from the towing unit to either the right side or the left side through an angle of at least 15 degrees and is also positionable to the center position for towing the machine 10 directly behind the towing unit. The cylinders 26 connected to the tow bar 24 and the ring 30 add to the rigidity of the tow bar by the triangular configuration of the assembly. The cylinders 26 also lock the tow bar 24 in position once the desired adjustment has been made.

The end 50 of the tow bar 24 which is connectable to a towing unit such as the tractor 16 is provided with an adjustable jack stand 52. The stand 52 includes a hitch 53, such as a clevis type, that is connectable to the hitch of the tractor. The jack stand 52 is slidably moveable in a sleeve 54 of the tow bar 24 by a cylinder 56 fitted to the stand 52 and the end of the tow bar 24 in a conventional manner. The height of the tow bar 24 may thus be adjusted relative to the tractor hitch by the cylinder 56.

The bales 12 in the bale row (see FIGS. 1a and 1b) are prevented from sliding relative to the ground by the succeeding bales in abutment. The last bale in the row does not have an adjacent bale to prevent it from sliding on the ground and as it is elevated, there is not a resistive force applied to maintain its position relative to the ground to thus force it through the tunnel of the machine once it is elevated on the guide mechanism 20. A stop rod 58 is provided to prevent the last bale from sliding on the ground and to maintain its relative position in relation to the preceding bale. As illustrated in dash line in FIG. 1, one end of the stop rod 58 is forced into the end of the last bale and the opposite end of the stop rod 58 is driven into the ground. The stop rod 58 will thus prevent the last bale from sliding relative to the ground and maintain the bale in abutment with the preceding bale and as the machine progresses under the last bale, the stop rod 58 will maintain the last bale in position relative to the ground to ensure that the last bale is also placed in the sheath 14 in abutment with the preceding bale. The stop rod 58 is conveniently stored on the tow bar as illustrated in solid line.

As most clearly shown in FIG. 3 (but also referring to FIGS. 1 and 2), the machine 10 has a carriage for transport and includes structure connected to wheels 60 for adjusting the elevation of the machine 10 relative to the ground. The wheels 60 are rotatably mounted on an end 62 of a pivot arm 64 in a conventional manner. The opposite end 66 of the pivot arm 64 is pivotally mounted to a cross member 68 fixedly attached to the bottom of the ring 30. A bracket 70 fitted to the ring 30 and a bracket 72 on the end 62 of the pivot arm 64 are provided for mounting an adjusting cylinder 74 in a conventional manner. Operation of the cylinder 74 will thus pivot the pivot arm 64 to thus either elevate or lower the machine 10 relative to the ground. The adjustable jack stand 52 is utilized in conjunction with the elevation of the machine by the wheels 60 to maintain the proper attitude of the machine and in particular the guide and lift mechanism 20 with respect to the ground.

FIG. 3 of the drawings also most clearly illustrates the bag or sheath holding and stretching structure of the tunnel 18 of the machine 10. This structure in particular includes the arrangement of the adjustable fingers 22 and the fixed fingers 82 which are preferably of stainless steel. The adjustable fingers 22 in cooperation with the fixed fingers 8 provide the structure for stretching the sheath 14 radially from its normal relaxed state to an expanded state. In this embodiment the machine 10 is arranged to sheath two different sized bales, either bales of four foot or five foot diameters. As viewed in FIG. 3, the left side shows the fingers arranged to sheath four foot bales and the right side shows the fingers arranged to sheath five foot bales. In reference to the figure, a pan 80 which is part of the guide and elevating structure 20, is fixedly attached to the inside bottom of the ring 30 and extends rearwardly a sufficient distance from the ring to accommodate the length of the folded or bunched up sheath 14. Fingers 82 preferably of a length to extend to the edge of the pan 80 are fixedly attached to the underside of the pan 80. The fingers 82 are not moveable in reference to the ring 30.

The adjustable fingers 22 are provided in paired sets and for reference will be referred to as a lower set, a mid set and an upper set. Lower meaning that the pair is closer to the bottom of the ring 30, mid referring to near center in reference to the ring and upper referring to the set on the upper portion of the ring. As seen from the figure, the lower set and mid set of fingers 22 requires the least movement and the upper set of fingers 22 require the greatest movement to stretch the sheath 14 in a symmetrical manner in reference to the fixed fingers 82 and the pan 80. In this embodiment, the lower and mid set of fingers have a stroke capability of eight inches and the upper set of fingers have a stroke capability of ten inches. It is desired to approach a circular configuration, but as evidenced by the figure and the dashed line of the outline of the stretched sheath 14 which in effect defines the dimension of the opening of tunnel 18, the circle would be inscribed within a polygon. The inscribed circle is the desired dimension to permit free passage of the bale without interfering with the sheath 14 as the bale passes through the machine. The imaginary circle is not enlarged simply by radially extending the adjustable fingers uniformly from a fixed center point. The adjustable fingers 22 extend upwardly at designated directions to maintain circular symmetry while allowing for the center of the circle to move upwardly as required by the placement of fixed fingers 82.

Figure 4:
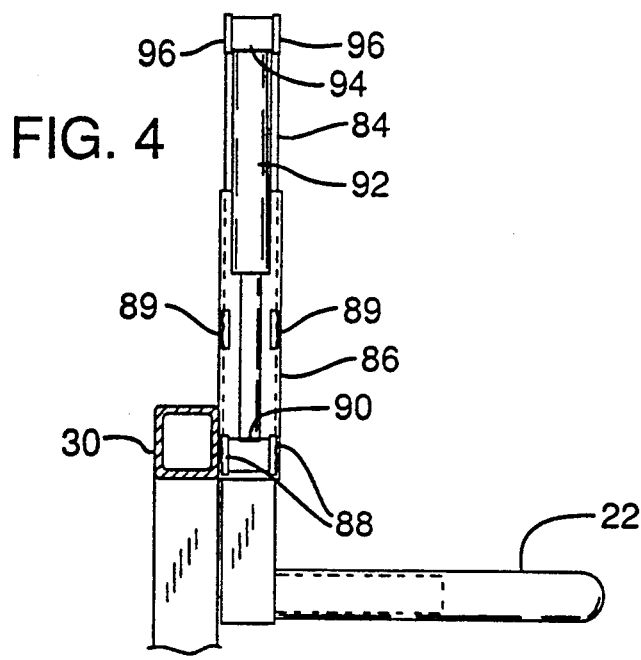
FIG. 4 is a section view of a stretcher arm as taken on view lines 4—4 of FIG. 3; and, FIG. 5 is a block diagram of the hydraulic circuit.

Referring also now to FIG. 4, the lower set of fingers 22 are fixedly attached to stretcher arms 84 that are slidably mounted in arm sockets 86 fixedly welded to the ring 30. The sockets 86 have two brackets 88, 89 for mounting an end 90 of a cylinder 92 in two alternative positions. Bracket 88 is utilized for the smaller sized bale and bracket 89 is utilized for the larger sized bale. The opposite end 94 of the cylinder 92 is mounted to a bracket 96 on the stretcher arm 84. The stretcher arms 84 are thus slidably moveable in the sockets 86 by action of the cylinders 92 and will move the fingers 22 fixedly attached to the end of the arms 84 radially with respect to the ring 30.

From FIG. 3, the mid set of fingers 22 are fixedly attached to stretcher arms 98 that are slidably mounted in arm sockets 100 fixedly welded to the ring 30. The sockets 100 have two brackets 88, 89 for mounting an end 102 of a cylinder 104 in two alternative positions. Bracket 88 is utilized for the smaller sized bale and bracket 8 is utilized for the larger sized bale. The opposite end 106 of the cylinder 104 is mounted to a bracket 96 on the stretcher arm 98. The stretcher arms 98 are thus slidably moveable in the sockets 100 by action of the cylinders 104 and will move the fingers 22 fixedly attached to the end of the arms 84 radially with respect to the ring 30.

The upper set of fingers 22 are fixedly attached to stretcher arms 108 that are slidably mounted in arm sockets 110 fixedly welded to the ring 30. The sockets 110 have two brackets 88, 89 for mounting an end 112 of a cylinder 114 in two alternative positions. Bracket 8 is utilized for the smaller sized bale and bracket 89 is utilized for the larger sized bale. The opposite end 116 of the cylinder 114 is mounted to a bracket 96 on the end of the stretcher arm 108. The stretcher arms 108 are thus slidably moveable in the sockets 110 by action of the cylinders 114 and will move the fingers 22 fixedly attached to the end of the arms 108 radially with respect to the ring 30.

For clarity of the drawings, the hydraulic lines to the cylinders are not shown. Plumbing and the interconnection of the lines are well known in the art and it is not deemed necessary to illustrate or describe in detail for an understanding of the invention. A protective cover 28 as illustrated in FIG. is provided for containment of the required hydraulic lines. A typical control station is shown in FIG. 1 with individual levers provided to control the hydraulic valves to affect motion of the cylinders and a typical circuit diagram is illustrated in the block diagram of FIG. 5. It is also recognized that many agricultural tractors include hydraulic pumps and valve bodies so all that is required is to connect the hydraulic lines of the machine 10 to the appropriate connections on the tractor and thus the control station illustrated in FIG. 1 would not be necessary.

Figure 5:
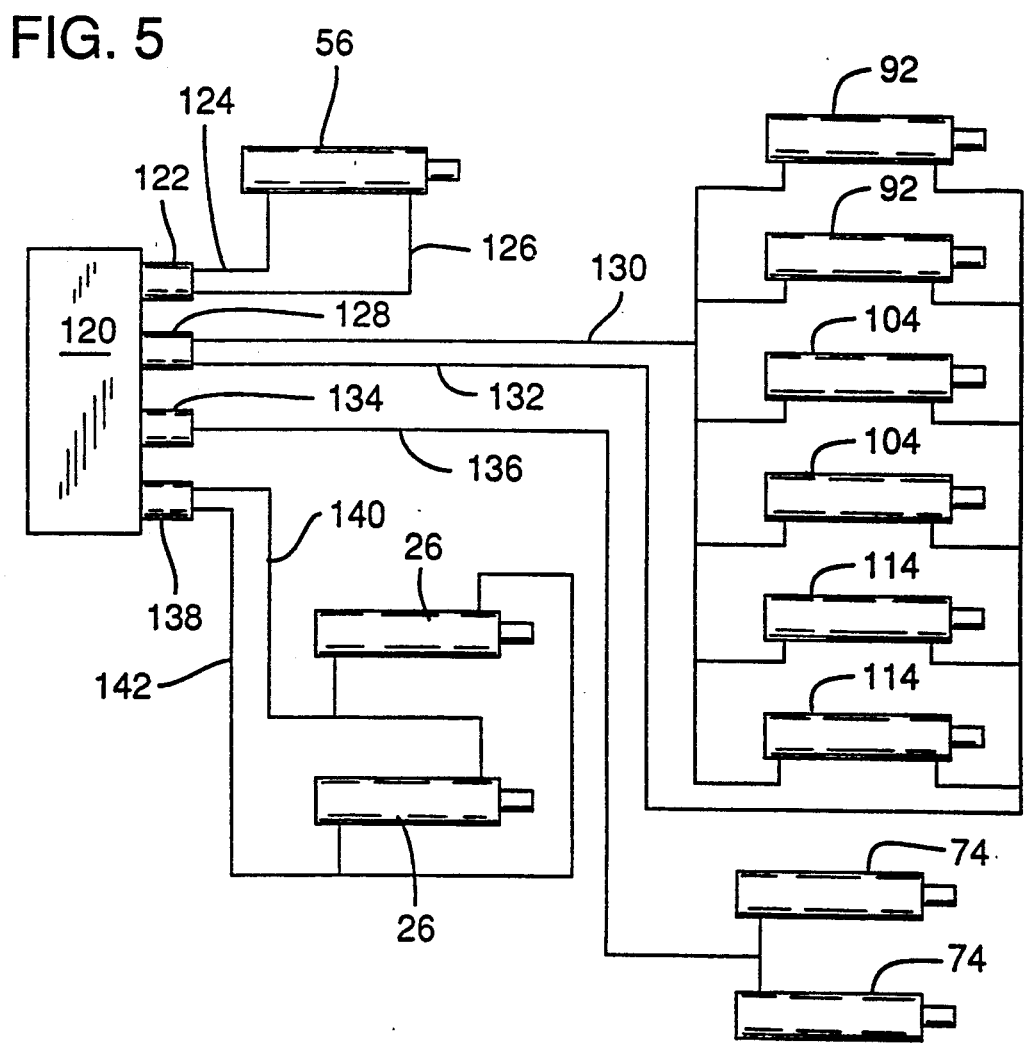

Refer now to FIG. 5. A hydraulic pump 120 provides the necessary flow of fluid to operate the cylinders of the machine 10. A valve 122 controls the hydraulic flow to the jack stand cylinder 56 via hydraulic lines 124 and 126 to extend and retract the cylinder rod in a conventional manner. A valve 128 controls the hydraulic flow to; the cylinders 92 which operate the lower finger set 22, the cylinders 104 which operate the mid finger set 22 and the cylinders 114 which operate the upper finger set 22 via hydraulic lines 130 and 132 to extend and retract the cylinders 92, 104 and 114 in a conventional manner. A valve 134 controls the carriage cylinders 74 via line 136. The carriage cylinders 74 can be single acting cylinders as the weight of the machine 10 will act to force the cylinder rods to retract when positive pressure is relieved in line 136. A valve 138 controls the steering cylinders 26 via hydraulic lines 140 and 142 in a conventional manner. The steering cylinders 26 operate cooperatively to pivot the tow bar 24 and therefore as one cylinder 26 is extending, the other cylinder 26 is retracting.

Those skilled in the art will recognize that variations and modifications may be made without departing from the true spirit and scope of the invention. The invention is therefore not to be limited to the embodiments set forth but is to be determined by the appended claims.

What is claimed is:

1. A towable bale sheathing machine for attachment to a towing unit having a power source for sheathing bales of a designated cross-section in tubular elastically expandable bags having a non-expanded cross-section that is no greater than the bale cross-section, said machine comprising;
   a bale receiving ring for passage therethrough of bales of compacted farm crop material,
   a carriage supporting said ring adapted to be moved along the ground,
   a bale guiding mechanism on the machine for engaging and guiding bales lying on the ground into and through the bale receiving ring,
   a plurality of fingers slidably mounted to the ring for inwardly and outwardly directed movement and arranged in a curvilinear pattern to provide an expandable tunnel opening through the ring, a gathered tubular elastically expandable bag adapted to enclose a plurality of bales, said bag mounted onto and encircling the plurality of fingers,
   a plurality of cylinders for controlling the slidable movement of said fingers and the combination of cylinders controlling the slidable movement of all of said fingers, said slidable movement providing outwardly directed movement of the fingers for elastically expanding the bag opening to accommodate entry of said bales, the material of said bag and the material and configuration of said fingers cooperatively permitting resistive sliding of the bag from the fingers as the bales are directed through the ring whereby said bag collapses around said bales when pulled free of the fingers, and said plurality of cylinders adapted to be coupled to the towing unit's power source to power the slidable movement of said fingers.

2. A bale sheathing machine as defined in claim 1 wherein said bales are arranged in an elongate row including;
   a tow bar extending from said machine, a connecting mechanism connecting said tow bar to an upper portion of said ring, said connecting mechanism providing pivotal movement around a vertical axis at the point of connection, and said tow bar extending forwardly of said ring toward a towing unit for pulling said machine in a designated direction of travel in line with said elongate row of bales, said tow bar being pivotable through an angle between a position in line with said designated direction and laterally offset therefrom and to one side of the elongate row of bales, said tow bar having a length for coupling the tow bar to said towing unit with the tow bar in the offset position with the towing unit spaced substantially forward of said ring to provide a mechanical advantage for resisting side pull on the towing unit, whereby the designated direction of travel of said machine is aligned with said row of bales and the towing unit is directed in parallel relation alongside the row of bales, and
   a locking mechanism for locking the angular orientation of the tow bar and thereby the relation of the machine and towing unit.

3. A bale sheathing machine as defined in claim 2 wherein the tow bar is pivotable to an offset position of at least 15 degrees form the in line position to an offset position at both sides of the elongate row of bales being bagged, said locking mechanism locking the angular orientation of the tow bar at a designated angle on either of the sides of the bales, and said locking mechanism including a motor mechanism for adjusting the angular orientation of the tow bar to a selected side or the in line position.

4. A bale sheathing machine as defined in claim 3 wherein the tow bar extends form the top of the ring to said towing unit, and bracing plates provided at the point of connection between the tow bar and ring that prevent movement of the tow bar relative to the ring other than about said vertical axis.

5. A bale sheathing machine as defined in claim 4 wherein said carriage comprises wheels, and said bale guiding mechanism includes a bale guide and adjusting mechanism for adjusting the bale guide relative to the wheels to elevate and lower the guide relative to the ground.

6. A bale sheathing machine as defined in claim 1 including adjusting mechanism adjusting the movable fingers to accommodate different bag sizes and accordingly different bale sizes.

7. A bale sheathing machine as defined in claim 6 wherein the cylinders for moving the fingers are hydraulically driven by said power source, and including a separate cylinder for each movable finger to minimize the hydraulic power requirements for expanding said expandable bags.

8. A bale sheathing machine as defined in claim 7 wherein said bale guiding mechanism in part defines the bottom portion of the tunnel opening, said inwardly and outwardly directed movement of said movable fingers being substantially radially directed from an upwardly moving center point as the tunnel circle is increased by the outward movement of said movable fingers.

* * * * *